(12) United States Patent
Ge et al.

(10) Patent No.: US 7,380,312 B2
(45) Date of Patent: Jun. 3, 2008

(54) COVER RESTRICTING MECHANISM

(75) Inventors: Peng-Jin Ge, Shenzhen (CN); Rui-Hao Chen, Shenzhen (CN); Xing-Huang Luo, Shenzhen (CN); Ye Liu, Shenzhen (CN); Shui-Yuan Qin, Shenzhen (CN); Hsiao-Hua Tu, Tu-cheng (TW)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 163 days.

(21) Appl. No.: 11/228,883

(22) Filed: Sep. 16, 2005

(65) Prior Publication Data
US 2006/0112518 A1 Jun. 1, 2006

(30) Foreign Application Priority Data
Nov. 26, 2004 (TW) .................................. 93219047

(51) Int. Cl.
*E05D 11/08* (2006.01)
(52) U.S. Cl. .............................. 16/342; 16/337; 16/296
(58) Field of Classification Search ................... 16/342, 16/330, 303, 325–329, 374, 76–78, 337, 16/296–297; 361/680–683, 814; 455/575.1, 455/575.4, 575.8, 550.1, 90.3; 348/373, 348/794, 333.06; 379/433.12–433.13
See application file for complete search history.

(56) References Cited

U.S. PATENT DOCUMENTS

| 2,706,307 | A | * | 4/1955 | Anderson | 16/293 |
| 5,436,792 | A | * | 7/1995 | Leman et al. | 361/686 |
| 5,566,048 | A | * | 10/1996 | Esterberg et al. | 361/681 |
| 5,634,241 | A | * | 6/1997 | Fischer | 16/285 |
| 5,894,632 | A | * | 4/1999 | Fischer | 16/285 |
| 6,125,509 | A | * | 10/2000 | Hartigan et al. | 16/337 |
| 6,456,365 | B1 | * | 9/2002 | Hosaka et al. | 355/75 |
| 6,601,269 | B2 | * | 8/2003 | Oshima et al. | 16/342 |

\* cited by examiner

*Primary Examiner*—Chuck Y. Mah
(74) *Attorney, Agent, or Firm*—Jeffrey T. Knapp

(57) ABSTRACT

A cover restricting mechanism is adapted for use in a foldable electronic device. The cover (10) has a first barrel portion (13) at one end thereof. The cover restricting mechanism includes a blocking element and a cushion device (20). The blocking element is secured to and protrudes out of the first barrel portion of the cover. The cushion device includes a sleeve (21) and an elastic element (22). The sleeve includes an extending portion (216) extending axially thereof. One end of the elastic element is secured on the sleeve. The other end of the elastic element protrudes out of the extending portion of the sleeve and abuts the blocking element.

20 Claims, 6 Drawing Sheets

COVER RESTRICTING MECHANISM

BACKGROUND OF THE INVENTION

1. Field of the Invention

The present invention relates to cover restricting mechanisms and, particularly, to a cover restricting mechanism for a foldable electronic device such as a mobile telephone, an electronic notebook, and so on.

2. Discussion of the Related Art

With the development of the technologies of wireless communication and information processing, portable electronic devices such as mobile telephones and electronic notebooks are now in widespread use. These electronic devices enable consumers to enjoy the convenience of high technology services anytime and anywhere. Foldable electronic devices are particularly welcome by consumers for their convenience.

Generally, foldable electronic devices have most of the electronics in one housing, called the main body. The other housing, called the flip cover, normally contains fewer electronic components than the main body. Other foldable electronic devices have all the electronics in the main body, with the flip cover containing no electronics. Various types of hinge assemblies are used to join a main body and a flip cover of a foldable electronic device, so that the flip cover can unfold and fold relative to the body. Manufacturers are constantly seeking to reduce the volume, size and weight of such foldable electronic devices. Also, it is desirable for the hinge assembly coupling the main body with the flip cover to have a long working lifetime.

A modularized hinge assembly generally has moving parts such as a cam member having a cam surface, a cam follower having a cam follower surface, a spring, a shaft, and a housing. The cam member, the cam follower, and the spring are placed around the shaft, and then received in the housing, thereby being held together in a unified structure. The housing is secured to the main body of the foldable electronic device, and the cam member engages with the flip cover of the foldable electronic device. The cam member and the cam follower always contact each other by engagement of the cam and follower surfaces, these surfaces being forced together due to the action of the spring. When opening the flip cover, the flip cover is opened by hand, which makes the cam member rotate along with the flip cover. At the same time, the cam member urges against the cam follower, making the cam follower movable along the shaft and compressing the spring. When the cam member rides over a convex portion of the cam follower, the flip cover is opened to a predetermined angle. Releasing the flip cover, the cam follower urges against the cam member, under the force of the spring, and makes the cam member rotate, thus making the flip cover open fully.

In the above-described hinge assembly, when the flip cover is opened to a predetermined angle, the flip cover rotates to a predetermined position. This rotation occurs due to the engaging relationship of the cam follower and the cam member, such engagement being maintained under the force of the spring. However, the abrupt force of the spring of the hinge assembly has a large impact on the flip cover, which may damage the flip cover and/or decrease the working lifetime of the flip cover. Such a negative influence on the operation of the flip cover would expectedly reduce the working lifetime of the foldable electronic device, overall. In addition, many foldable electronic devices need to be opened to other positions such as 150° or 160° positions. This angle requirement means that the main body of the foldable electronic device itself needs to be specially designed in order to limit the maximum opening angle of the flip cover. This designing takes up valuable "real estate" on the main body, increases the complexity of the manufacture of the main body, and increases the overall volume and weight of the mobile phone. Furthermore, each time the flip cover is opened, it impacts the main body. The main body is liable to become worn or damaged due to such impact, thereby shortening the working lifetime of the mobile phone.

What is needed, therefore is to provide a cover restricting mechanism that overcomes the above-described problems.

SUMMARY OF THE INVENTION

A cover restricting mechanism is adapted for use in a foldable electronic device. The cover has a first barrel portion at one end thereof. The cover restricting mechanism includes a blocking element and a cushion means. The blocking element is secured to and protrudes out of the first barrel portion of the cover. The cushion means includes a sleeve and an elastic element. The sleeve includes an extending portion extending axially relative to the sleeve. One end of the elastic element is secured on the sleeve. The other end of the elastic element protrudes out of the extending portion of the sleeve and abuts the blocking element.

A cover restricting mechanism is adapted for use in a foldable electronic device. The cover has a first barrel portion at one end thereof. The cover restricting mechanism includes a blocking element and a cushion means. The blocking element is secured to and protrudes out of the first barrel portion of the cover. The cushion means includes a sleeve and an elastic element. The sleeve includes an extending portion extending axially relative to the sleeve. One end of the elastic element is secured on the sleeve. The other end of the elastic element protrudes out of the extending portion of the sleeve and abuts the blocking element. When the blocking element is in a first position, the blocking element is located a distance away from the elastic element. When the blocking element is in a second position, the blocking element abuts the elastic element. When the blocking element is in a third position, the blocking element abuts the extending portion.

When the cover restricting mechanism is installed in the foldable electronic device, opening and closing the cover is easy. When the user manually rotates the cover to a predetermined angle toward an open position, the restricting mechanism can reduce impact of the cover as a result of the abrupt force generated by a spring of a hinge assembly installed in the foldable electronic device. Also, the restricting mechanism can reduce the vibration/shaking of the cover. In addition, the extending portion of the sleeve is configured such that it can effectively limit the open angle of the cover. Furthermore, the structure of cover restricting mechanism is simple and thus may not increase the volume of the foldable electronic device.

Other advantages and novel features will become more apparent from the following detailed description when taken in conjunction with the accompanying drawings.

BRIEF DESCRIPTION OF THE DRAWINGS

Many aspects of the cover restricting mechanism can be better understood with reference to the following drawings. The components in the drawings are not necessarily to scale, the emphasis instead being placed upon clearly illustrating the principles of the present cover restricting mechanism.

Moreover, in the drawings, like reference numerals designate corresponding parts throughout the several views.

DETAILED DESCRIPTION OF PREFERRED EMBODIMENTS

Figure 1:
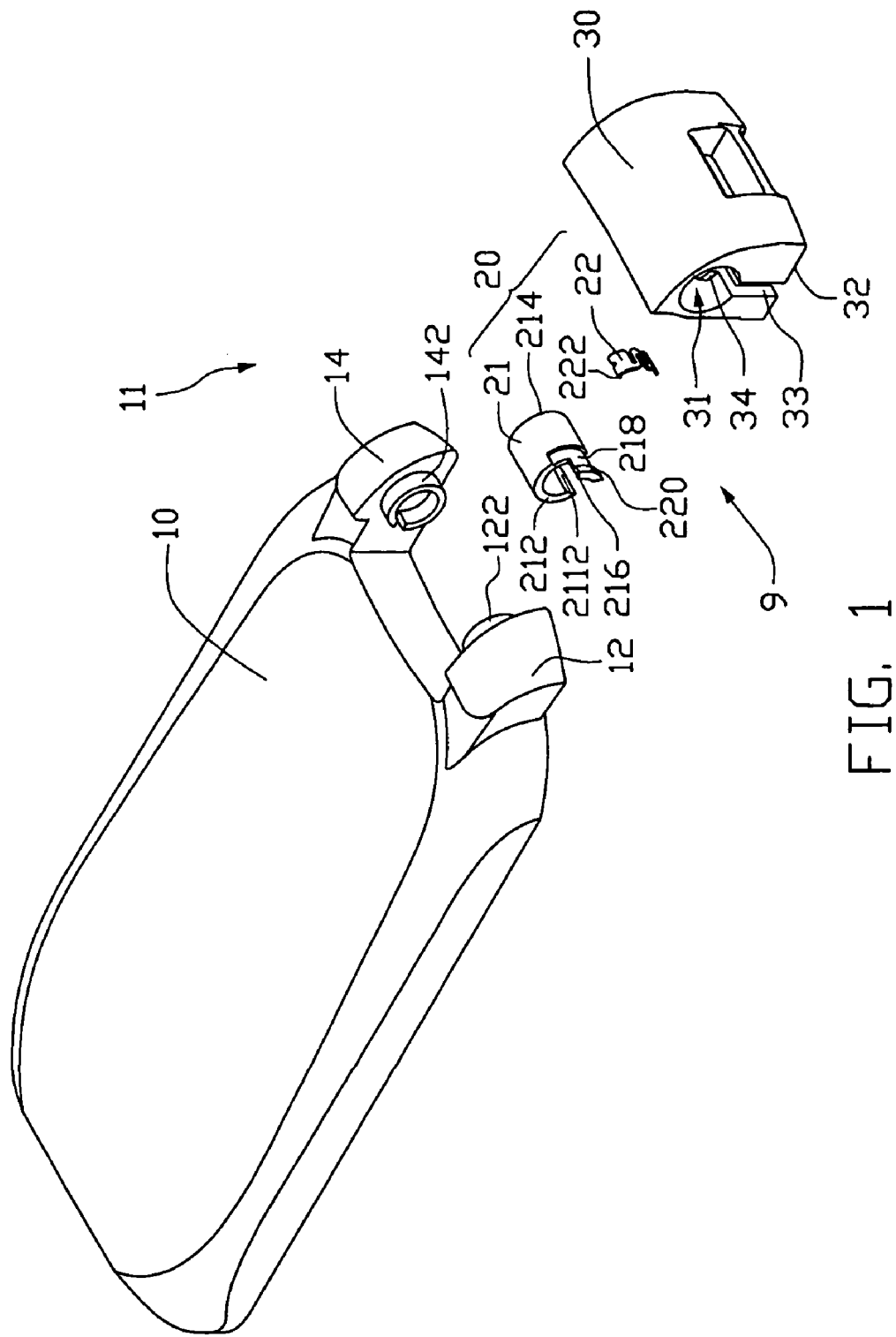
FIG. 1 is an exploded, isometric view of the present cover restricting mechanism, incorporated in a foldable electronic device, in accordance with one preferred embodiment of the present mechanism.

Referring now to the drawings, FIG. 1 shows a cover restricting mechanism 9 according to a preferred embodiment of the present mechanism. The cover restricting mechanism 9 is adapted for use in a foldable electronic device 11.

The foldable electronic device 11 includes a main body (not shown), a cover 10, a housing 30, and a hinge assembly (not shown), hinging the main body and the cover 10 together. The hinge assembly is contained in the housing 30. The hinge assembly can be any kind of hinge assembly, the hinge assembly generally, for example, including a shaft, a cover driven member, a body driven member, and a spring. The cover 10 includes a first support portion 12 and a second support portion 14, each of which is formed at one end of the cover 10 and opposite to each other.

Referring further to FIG. 1, the cover restricting mechanism 9 is further composed of a first barrel portion 122 and a second barrel portion 142. The first barrel portion 122 and the second barrel portion 142 extend from the first support portion 12 and the second support portion 14, respectively. The first barrel portion 122 has a blocking portion 16 (referring to FIG. 4) extending from one end thereof.

Figure 2:
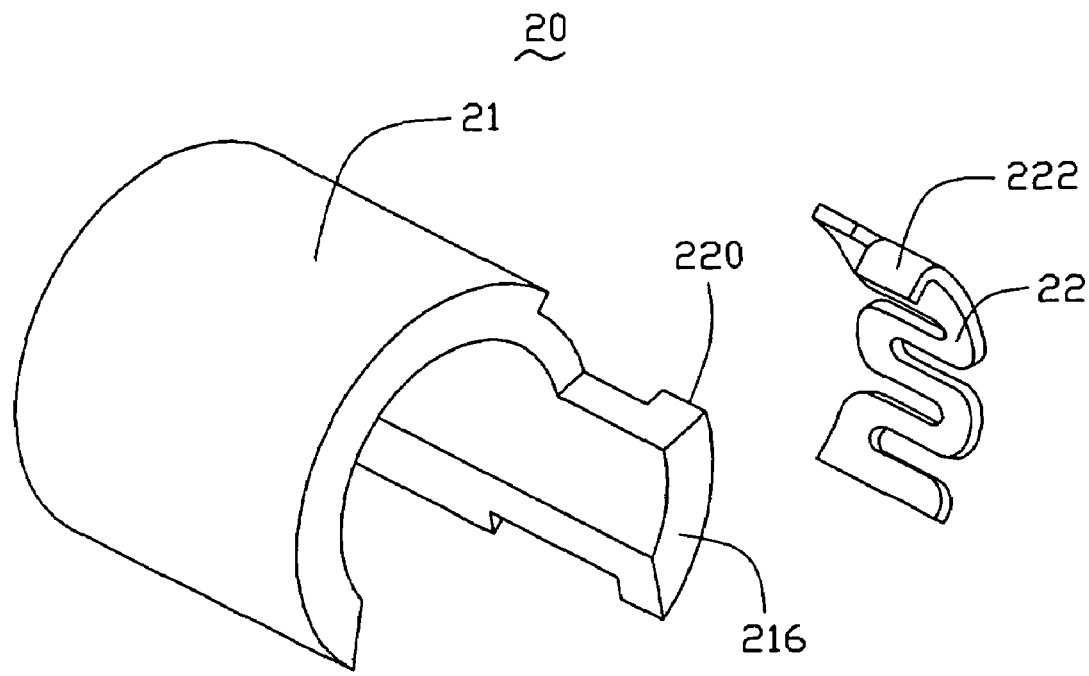
FIG. 2 is an isometric view of a cushion means of the cover restricting mechanism of FIG. 1.

Referring now to FIG. 2, the cover restricting mechanism 9 has a cushion device or means 20 as one of its components. The cushion means 20 includes a sleeve 21 and a leaf spring 22. The sleeve 21 is a hollow cylinder with a first open end 212, a second open end 214, and an axial opening (not labeled). The axial opening is defined between two opposite opening end portions 2112, 2114 (referring to FIG. 4), which correspond to the first open end 212 and the second open end 214, respectively. An arcuate extending portion 216 extends axially from the first open end 212. The sleeve 21 has a groove or recess 218 defined in an outer wall thereof. The groove 218 extends to the extending portion 216, thereby forming an arcuate stage 220 at one end of the extending portion 216.

The leaf spring 22 is a sheet-like spring, formed by punching a sheet of metallic material. The leaf spring 22 has a wave shape. The leaf spring 22 includes a bent portion 222 at one end thereof. The outer shape of the leaf spring 22 corresponds to the shape of the groove 218 and is received therein. One side of the leaf spring 22 abuts the stage 220 of the sleeve 21, and the bent portion 222 protrudes out of the groove 218. The cushion means 20 is, as a whole, contained in the housing 30.

Figure 3:
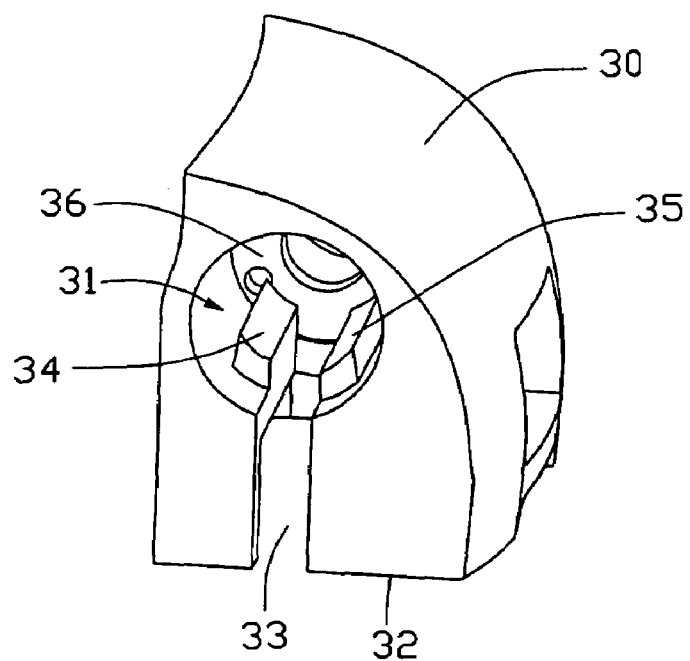
FIG. 3 is an isometric view of a housing containing the cushion means of FIG. 2.
Figure 4:
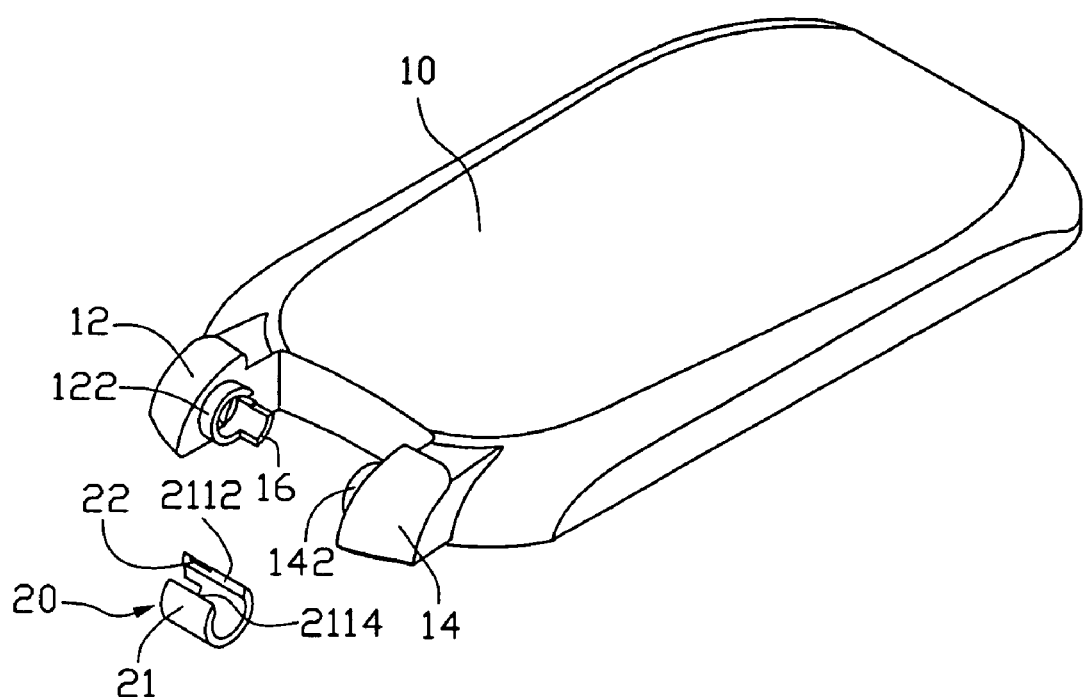
FIG. 4 is an exploded, isometric view of the embodiment of the cover restricting mechanism of FIG. 1, but viewed from another aspect.
Figure 5:
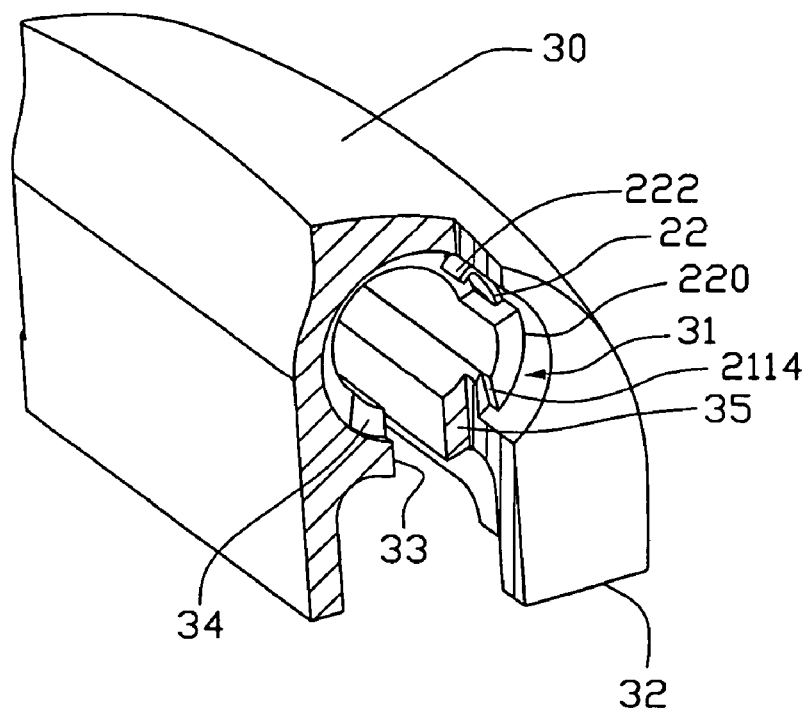
FIG. 5 is a partial cross-sectional view of the housing, as per FIG. 3, incorporating the cushion means.

Referring to FIGS. 3-5, the housing 30 is a hollow cylinder and has a receiving hole 31 defined therein. Further, the housing 30 has a bottom wall 32. The receiving hole 31 is a through hole, thereby forming a first open end (not labeled) and a second open end (not labeled) in the housing 30. The housing 30 has a second axial opening 33 extending from the receiving hole 31 to the bottom wall 32. Two longitudinal protrusions 34, 35 are symmetrically disposed on the inner wall of the housing 30 and are positioned adjacent the second axial opening 33. A circular baffle 36 protrudes from the inner periphery of the housing 30. The protrusions 34, 35 extend a predetermined distance in the axial direction and resist the opening end portions 2112, 2114 of the sleeve 21 in order to secure the sleeve 21 in the housing 30. The circular baffle 36 resists the second open end 214 of the sleeve 21, the baffle 36 being configured for preventing the sleeve 21 from sliding in the housing 30.

Figure 6:
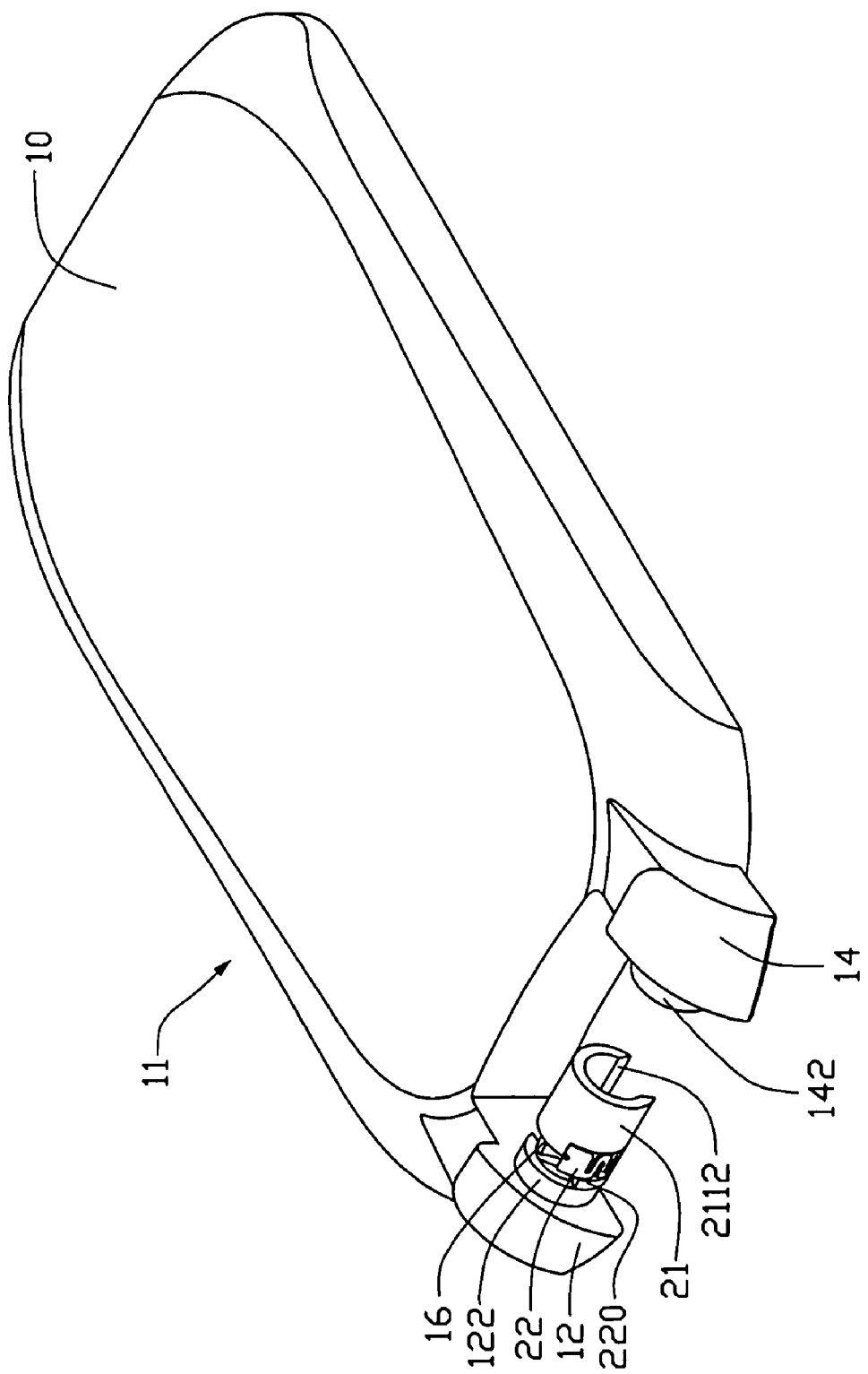
FIG. 6 is an isometric view of a cover incorporating the cover restricting mechanism of FIG. 1, in a closed position.

Referring also to FIG. 6, in assembly, the cushion means 20 is received in the housing 30 via the first open end of the housing 30. The cushion means 20 is secured in the housing 30 by the abutment between the protrusions 34, 35 of the housing 30 and the respective open end portions 2112, 2114 and by the abutment between the circular baffle 36 and the second open end 214 of the sleeve 21. The first barrel portion 122 of the cover 10 is received in the housing 30 via the first open end of the housing 30. The first barrel portion 122 abuts the extending portion 216 of the sleeve 21. The blocking portion 16 abuts one end of the sleeve 21. The hinge assembly is received in the housing 30 via the second open end of the housing 30. The second barrel portion 14 of the cover 10 engages with the cover driven member of the hinge assembly and is received in the housing 30 via the second end of the housing 30. The body driven member of the hinge assembly is securely connected with the housing 30, and the housing 30 is securely connected with the main body.

Figure 7:
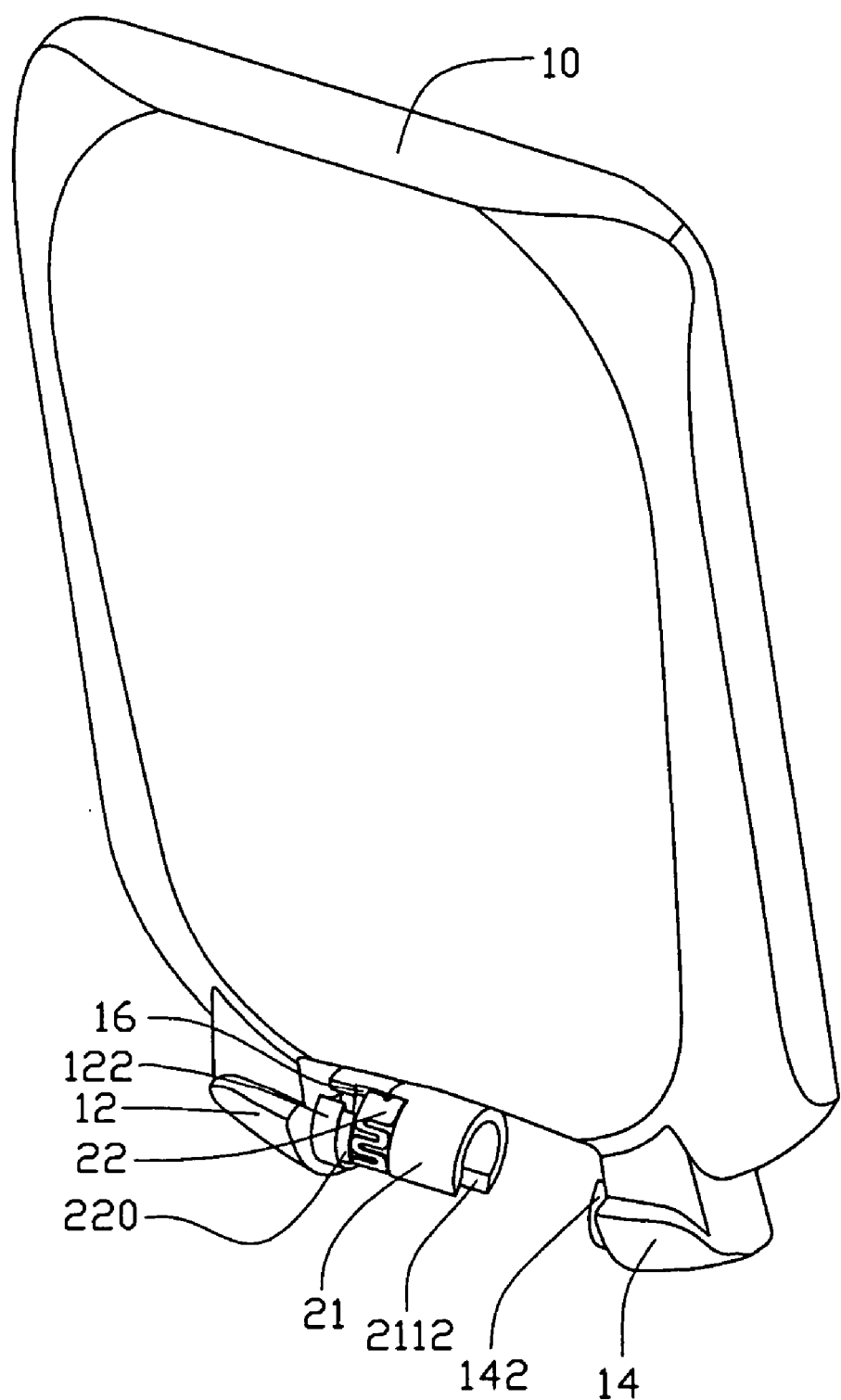
FIG. 7 is similar to FIG. 6, but showing the cover opened in a predetermined, intermediate position.
Figure 8:
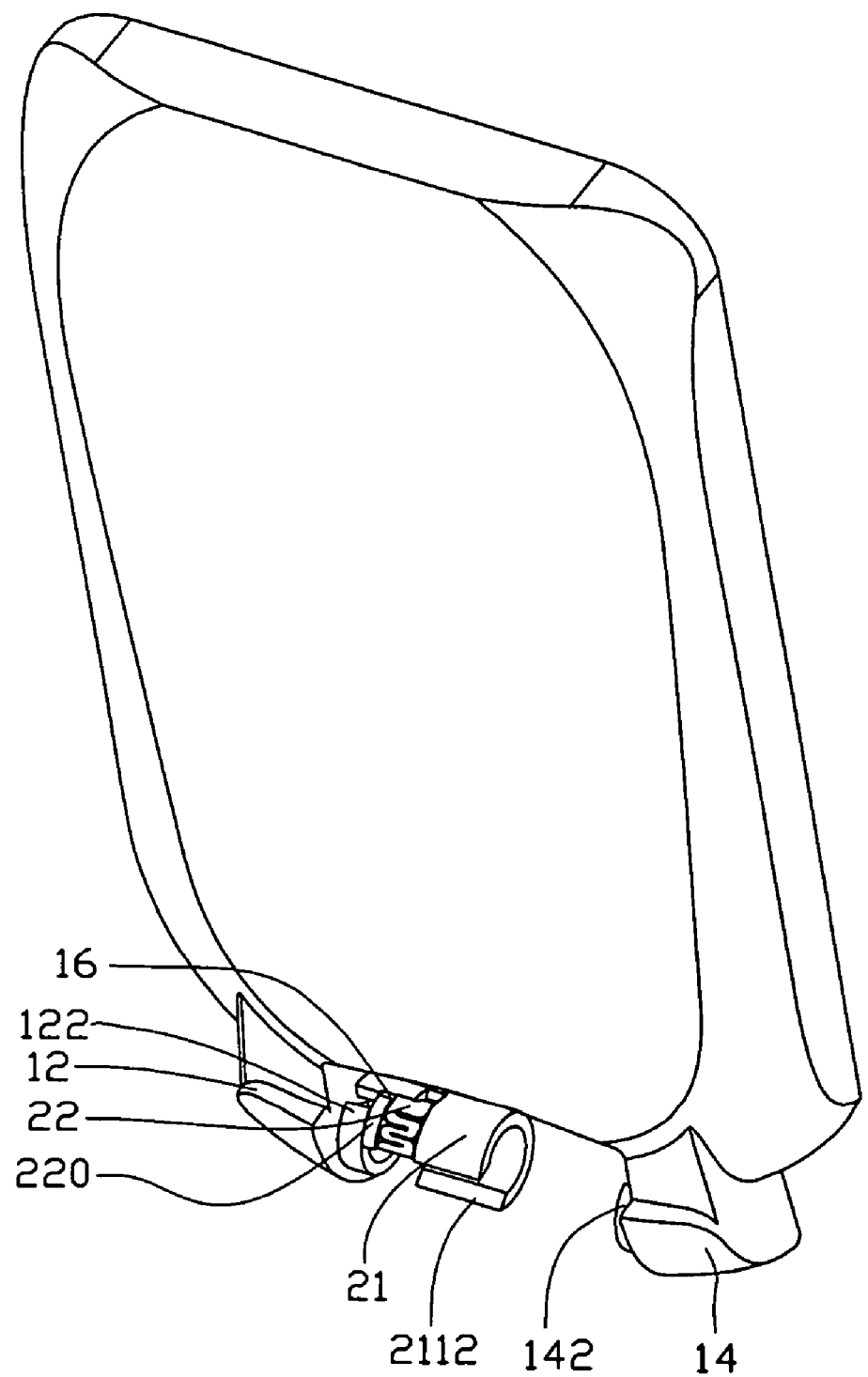
FIG. 8 is similar to FIG. 6, but showing the cover in a full open position.

Referring to FIGS. 7-8, in use, when a user wants to open the cover 10, he/she may manually rotate the cover 10 up to an open position. When the cover 10 is opened to a predetermined angle, the cover 10 is opened automatically under the force of the spring of the hinge assembly because of the release of the spring. In this process, the blocking portion 16 of the cover 10 first contacts and abuts the bent portion 222 of the leaf spring 22, and thus the opening rate of the cover 10 is slowed down by the force of the leaf spring 22. This reduction in the speed/force at which the cover 10 is able to open mitigates the impact on the cover 10. The cover 10 continues to open under the hinge assembly and compresses the leaf spring 22 until the blocking portion 16 of the cover 10 makes the bent portion 222 of the leaf spring 22 abut one side of the stage 220. At this time, the cover 10 is in a full open position, and the leaf spring 22 is compressed in a maximum state. At this state, the cover 10 has a tendency to continue to open under the hinge assembly. However, the stage 220 of the sleeve 21 abuts the blocking portion 16 of the cover 10, thereby preventing the cover 10 from opening further.

When the user wants to close the cover 10, he/she may manually rotate the cover 10 to the closed position. Because the cover 10 is actually urged by the force of the leaf spring 22 toward the closed position, the effective force required in closing the cover 10 against the force of the spring of the hinge assembly is reduced, thus facilitating the closing of the cover 10.

In an alternative embodiment, two (only one of which is illustrated) cushion means 20 can be provided. That is, the two cushion means are respectively contained in the two open ends of the housing 30. The cover driven member can be constructed so long that it can be connected with the first barrel portion 122 or with the second barrel portion 142 of the cover 10. In addition, the cushion means 20 can be secured by any other kind way. The blocking portion 16 can, likewise, be a separate blocking element (not illustrated as such) secured on to the first barrel portion 13 of the cover 10 and extending out of the first barrel portion 122. The leaf spring 22 can be another elastic element such as a coil spring (not shown).

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cover restricting mechanism for a foldable electronic device, the foldable electronic device including a cover and a housing, the cover restricting mechanism comprising:
   a barrel portion configured to be formed on the cover of the portable electronic device, the barrel portion having a blocking element formed thereon; and
   a cushion means comprising:
      a sleeve configured for securing with the housing of the portable electronic device, the sleeve having an extending portion formed thereon and a groove defined in an outer wall thereof, the extending portion configured for restricting movement of the blocking element, the groove defining a recessed surface therein; and
      an elastic element secured in the groove of the sleeve, the elastic element having a main portion and an end, the main portion having a shape corresponding to the shape of the recessed surface of the groove, the main portion being received in the groove against the recessed surface, the end of the elastic element protruding out from the extending portion of the sleeve so as to abut the blocking element when the blocking element moves toward the extending portion.

2. The cover restricting mechanism as claimed in claim 1, wherein the groove is defined in an outer periphery of the sleeve, the groove extending to the extending portion.

3. The cover restricting mechanism as claimed in claim 2, wherein a stage is formed on an outer end of the extending portion, and one side of the elastic element abuts the stage.

4. The cover restricting mechanism as claimed in claim 1, wherein the extending portion extends axially from the sleeve.

5. The cover restricting mechanism as claimed in claim 1, wherein the elastic element is a wave-shaped leaf spring.

6. The cover restricting mechanism as claimed in claim 5, wherein an end of the leaf spring comprises a bent portion, the bent portion protruding peripherally out from the sleeve.

7. The cover restricting mechanism as claimed in claim 1, wherein the blocking element is a blocking portion extending axially from the barrel portion.

8. A cover restricting mechanism for a foldable electronic device, the foldable electronic device including a cover and a housing, the cover restricting mechanism comprising:
   a barrel portion configured to be formed on the cover of the portable electronic device, the barrel portion having a blocking element formed thereon; and
   a cushion means comprising:
      a sleeve configured for securing with the housing of the portable electronic device, the sleeve having an extending portion formed thereon and a groove defined in an outer wall thereof, the extending portion configured for restricting movement of the blocking element, the groove defining a recessed surface therein; and
      an elastic element secured in the groove of the sleeve, the elastic element having a main portion and an end, the main portion having a shape corresponding to the shape of the recessed surface of the groove, the main portion being received in the groove against the recessed surface, the end of the elastic element protruding out from the extending portion of the sleeve;
   wherein the cover restricting mechanism is configured and arranged in such a manner that:
      when the blocking element is in a first position, the blocking element is located a distance away from the elastic element;
      when the blocking element is in a second position, the blocking element abuts the end of the elastic element; and
      when the blocking element is a third position, the blocking element is restricted by the extending portion of the sleeve, and the end of the elastic element is located between the blocking element and the extending portion.

9. The cover restricting mechanism as claimed in claim 8, wherein the groove is defined in an outer periphery of the sleeve, the groove extending to the extending portion.

10. The cover restricting mechanism as claimed in claim 9, wherein a stage is formed on an outer end of the extending portion, and one side of the elastic element abuts the stage.

11. The cover restricting mechanism as claimed in claim 8, wherein the extending portion extends axially from the sleeve.

12. The cover restricting mechanism as claimed in claim 8, wherein the elastic element is a wave-shaped leaf spring.

13. The cover restricting mechanism as claimed in claim 12, wherein the end of the leaf spring comprises a bent portion, the bent portion protruding peripherally out from the sleeve.

14. The cover restricting mechanism as claimed in claim 1, wherein the blocking element is a blocking portion extending axially from the barrel portion.

15. A foldable electronic device, comprising:
   a housing;
   a cover;
   a cover restricting mechanism comprising:
   a barrel portion formed on the cover of the portable electronic device, the barrel portion having a blocking element formed thereon; and
   a cushion means comprising:
      a sleeve configured for securing with the housing of the portable electronic device, the sleeve having an extending portion formed thereon and a groove defined in an outer wall thereof, the extending portion configured for restricting movement of the blocking element, the groove defining a recessed surface therein; and
      an elastic element secured in the groove of the sleeve, the elastic element having a main portion and an end, the main portion having a shape corresponding to the shape of the recessed surface of the groove, the main portion being received in the groove against the recessed surface, the end of the elastic element protruding out from the extending portion of the sleeve;

wherein the cover restricting mechanism is configured and arranged in such a manner that:

when the cover is in a closed position, the blocking element is located a distance away from the elastic element;

when the cover is opened at a predetermined, intermediate angle, the blocking element abuts the end of the elastic element; and when the cover is in a full position, the blocking element is restricted by the extending portion, and the end of the elastic element is located between the blocking element and the extending portion.

16. The foldable electronic device as claimed in claim 15, wherein the groove is defined in an outer periphery, of the sleeve, the groove extending to the extending portion.

17. The foldable electronic device as claimed in claim 16, wherein a stage is formed on an outer end of the extending portion, and one side of the elastic element abuts the stage.

18. The foldable electronic device as claimed in claim 15, wherein the blocking element being a blocking portion extending axially from the barrel portion of the cover, and the extending portion extending axially from the sleeve.

19. The foldable electronic device as claimed in claim 15, wherein the elastic element is a leaf spring.

20. The foldable electronic device as claimed in claim 19, wherein an end of the leaf spring comprises a bent portion, the bent portion protruding peripherally out from the sleeve.

* * * * *